US008827376B2

(12) United States Patent
Foerch et al.

(10) Patent No.: US 8,827,376 B2
(45) Date of Patent: Sep. 9, 2014

(54) DOUBLE INTERNAL GEAR PUMP

(75) Inventors: Dirk Foerch, Neuenstadt/Stein (DE);
Rene Schepp, Waiblingen (DE);
Norbert Alaze, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 201 days.

(21) Appl. No.: 13/501,136

(22) PCT Filed: Sep. 27, 2010

(86) PCT No.: PCT/EP2010/064211
§ 371 (c)(1),
(2), (4) Date: Aug. 24, 2012

(87) PCT Pub. No.: WO2011/045171
PCT Pub. Date: Apr. 21, 2011

(65) Prior Publication Data
US 2012/0315175 A1  Dec. 13, 2012

(30) Foreign Application Priority Data

Oct. 12, 2009  (DE) .......................... 10 2009 045 574

(51) Int. Cl.
| B60T 17/02 | (2006.01) |
| F04C 15/06 | (2006.01) |
| F04C 11/00 | (2006.01) |
| F04C 2/08 | (2006.01) |
| B60T 8/40 | (2006.01) |
| F04C 15/00 | (2006.01) |
| F04C 2/10 | (2006.01) |

(52) U.S. Cl.
CPC .............. *F04C 2/101* (2013.01); *F04C 15/064* (2013.01); *F04C 11/001* (2013.01); *F04C 2/086* (2013.01); *B60T 8/4031* (2013.01); *F04C 15/0026* (2013.01); *F04C 2230/60* (2013.01)
USPC .......................................................... 303/10

(58) Field of Classification Search
CPC ........ B60T 17/02; B60T 8/4031; B60T 8/368
USPC ............... 303/10, 11; 417/278, 426; 418/143, 418/152, 153, 166, 171, 199
See application file for complete search history.

(56) References Cited

U.S. PATENT DOCUMENTS

| 2,887,058 A | 5/1959 | Aspelin et al. |
| 2,974,600 A * | 3/1961 | Rystrom ....................... 417/278 |

(Continued)

FOREIGN PATENT DOCUMENTS

| DE | 100 53 991 A1 | 5/2002 |
| DE | 10053991 * | 5/2002 ............. B60T 17/02 |

(Continued)

OTHER PUBLICATIONS

International Search Report corresponding to PCT Application No. PCT/EP2010/064211, mailed Sep. 28, 2011 (German and English language document) (8 pages).

*Primary Examiner* — Christopher Schwartz
(74) *Attorney, Agent, or Firm* — Maginot, Moore & Beck

(57) ABSTRACT

A double internal gear pump has two internal gear pumps having a common pump shaft. A partition is formed between the two internal gear pumps, and the partition has a frustoconical circumferential surface which contacts an opposing in a sealing manner in a pump housing. Pump inlets and pump outlets can be led through the partition. The frustoconical circumferential surface of the partition is advantageous because it removes the necessity of pressing into the pump housing and canting the partition. In addition, a seal on the circumference of the partition is ensured with great realiability.

8 Claims, 2 Drawing Sheets

(56) References Cited

U.S. PATENT DOCUMENTS

| | | | |
|---|---|---|---|
| 3,396,668 A | | 8/1968 | Waldorff |
| 7,290,995 B2 * | | 11/2007 | Ohnishi et al. ............... 418/171 |
| 7,530,647 B2 | | 5/2009 | Yamaguchi et al. |
| 2003/0026722 A1 * | | 2/2003 | Takagi et al. ............... 418/171 |
| 2010/0322810 A1 * | | 12/2010 | Schepp et al. ............... 418/199 |
| 2012/0244028 A1 * | | 9/2012 | Schepp et al. ............... 418/166 |

FOREIGN PATENT DOCUMENTS

| | | |
|---|---|---|
| DE | 10 2007 054 808 A1 | 5/2009 |
| JP | 2007-278086 A | 10/2007 |

\* cited by examiner

DOUBLE INTERNAL GEAR PUMP

This application is a 35 U.S.C. §371 National Stage Application of PCT/EP2010/064211, filed on Sep. 27, 2010, which claims the benefit of priority to Ser. No. DE 10 2009 045 574.4, filed on Oct. 12, 2009 in Germany, the disclosures of which are incorporated herein by reference in their entirety.

BACKGROUND

The disclosure relates to a double internal gear pump with two internal gear pumps. The double internal gear pump is intended for a slip-controlled (ABS, ASR, ESP, FDR) hydraulic vehicle brake system, each of the two internal gear pumps being intended for a brake circuit. Such pumps in slip-controlled hydraulic vehicle brake systems are also designated as recirculating pumps, although is it customary for piston pumps to be considered, not gear pumps.

A double internal gear pump of this type is known from the laid-open publication DE 10 2007 054 808 A1. It has two internal gear pumps with a common pump shaft for joint drive with an electric motor. Pinions of the two internal gear pumps are arranged coaxially next to one another, with an axial clearance, on the pump shaft fixedly in terms of rotation. Ring wheels of the two internal gear pumps are arranged eccentrically to the pinions and the pump shaft and mesh with the pinions at a circumferential point or in a circumferential region. The known double internal gear pump has a pump casing in which the two internal gear pumps are arranged. Located in the pump casing between the two internal gear pumps is a partition which separates the two internal gear pumps spatially by the amount of the thickness of the partition and hydraulically.

SUMMARY

The partition of the double internal gear pump according to the disclosure possesses a circumferential surface which widens in one direction and which bears against a countersurface in the pump casing. For hydraulic separation of the two internal gear pumps, the circumferential surface of the partition bears sealingly against the countersurface in the pump casing. There is provision per se for the circumferential surface of the partition to bear over a large area against the countersurface of the pump casing over all or part of the circumferential surface of the partition, bearing contact having to be closed in the circumferential direction if hydraulic separation of the two internal gear pumps is to be achieved. However, it is conceivable, for example, also to have, instead of bearing contact over a large area, linear bearing contact along a continuous, preferably closed line.

The advantage of the disclosure is that the partition can be inserted into the pump casing more simply than a partition, the circumferential surface of which is axially parallel, for example cylindrical, tilting of the partition in the pump casing being largely ruled out.

A further advantage, as compared with a partition having a cylindrical circumferential surface, is more reliable leak tightness of the partition circumferential surface bearing against the countersurface of the pump casing, because there is no risk of the partition being pressed in over an axial travel corresponding to the thickness of the partition unreliably in terms of assembly. Another advantage is more reliable leak tightness of pump connections, that is to say pump inlets and/or outlets, where these are routed through the circumferential surface of the partition and the countersurface of the pump casing. During assembly, any sealing rings at issues of the pump connections in the circumferential surface of the partition or the countersurface of the pump casing come to bear against the respective countersurface only when the circumferential surface of the partition comes to bear against the countersurface of the pump casing. The disclosure prevents such sealing rings from being sheared off when a partition with a cylindrical circumferential surface is pressed into a hollow-cylindrical countersurface of a pump casing.

An internal gear pump in the context of the disclosure is also to be understood as meaning what is known as an annular gear pump.

The disclosure further discusses subject matter regarding advantageous refinements and developments of the internal gear pump.

The partition of the double internal gear pump according to the disclosure has a frustoconical circumferential surface, the cone frustum preferably being a straight circular cone frustum, although this is not mandatory for the disclosure. An oblique cone frustum and/or a cone frustum, the base of which is not a circle, are also possible. Another possibility of a circumferential surface widening in one direction is a pyramid frustum, the base of which can fundamentally be any regular or irregular polygon. The pyramid frustum, too, can be straight or oblique. The countersurface of the pump casing is preferably an exact reciprocal fit with the circumferential surface of the partition.

Preferably, the double internal gear pump is arranged in a hydraulic block of a hydraulic slip-controlled vehicle brake system, said hydraulic block forming the pump casing (claim 3). The hydraulic block connects the double internal gear pump hydraulically to further hydraulic components of the slip control of the vehicle brake system, such as solenoid valves, nonreturn valves, hydraulic accumulators and hydraulic dampers. The hydraulic block is connected to a brake master cylinder and wheel brakes of the vehicle brake system are connected to the hydraulic block. The two internal gear pumps of the double internal gear pump are separated hydraulically from one another, and each of the two internal gear pumps is assigned to a brake circuit of the vehicle brake system. The internal gear pumps form so-called recirculating pumps of the slip-controlled vehicle brake system.

A further advantage of the disclosure is the possibility of premounting the two internal gear pumps or at least their pinions and the partition arranged between them as a subassembly on the pump shaft and of inserting the subassembly into the pump casing (claim 4). This is possible because the partition does not have to be pressed into the pump casing.

BRIEF DESCRIPTION OF THE DRAWINGS

The disclosure will be explained in more detail below by means of an embodiment illustrated in the following figures.

DETAILED DESCRIPTION

Figure 1:
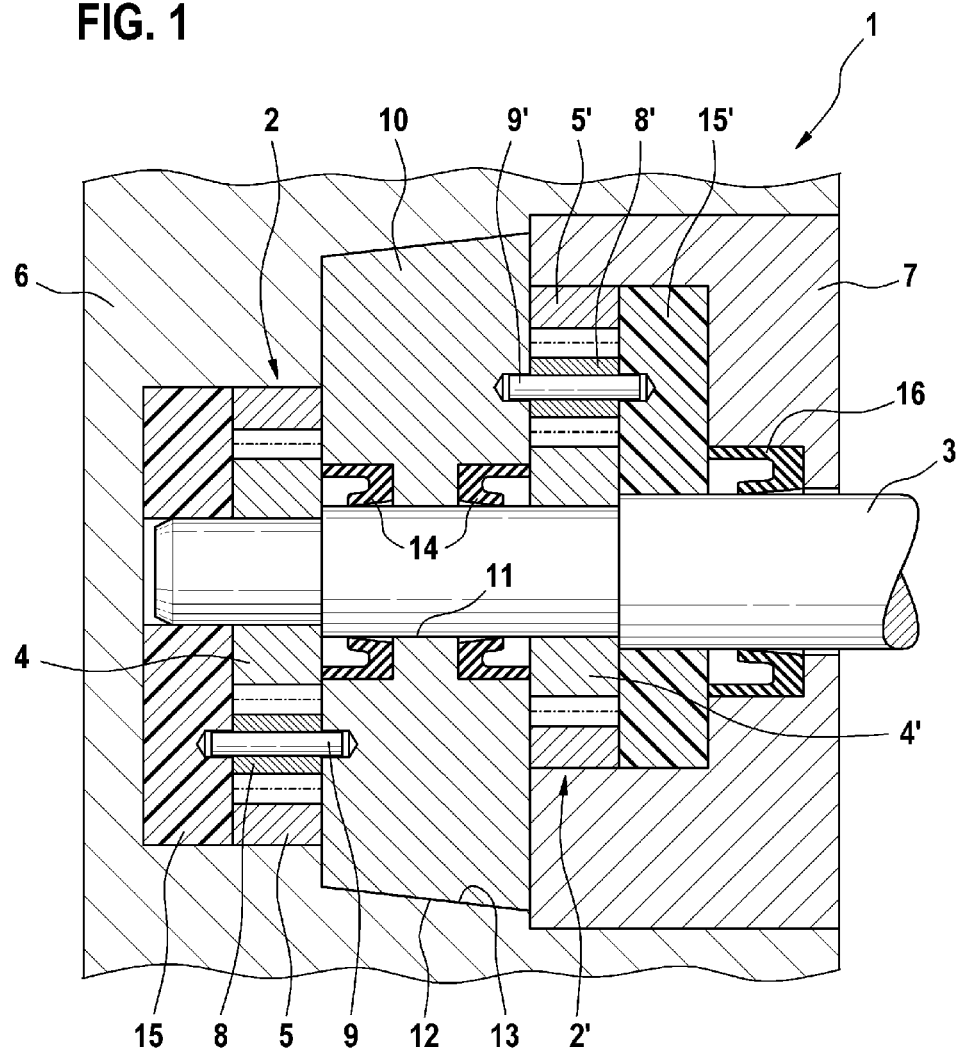
FIG. 1 shows an axial section through a double internal gear pump according to the disclosure.

The double internal gear pump 1 according to the disclosure, illustrated in FIG. 1, has two internal gear pumps 2, 2' which are separated hydraulically from one another and have a common pump shaft 3 for driving them. The internal gear pumps 2, 2' are provided as hydraulic pumps for the two brake circuits of a hydraulic vehicle brake system, not illustrated, having slip control (ABS, ASR, ESP, FDR). Such hydraulic pumps are also designated as recirculating pumps. The two internal gear pumps 2, 2' are arranged in mutually parallel planes radial to the pump shaft 3 and at an axial distance from one another. Pinions 4, 4' of the internal gear pumps 2, 2' are fastened fixedly in terms of rotation on the pump shaft 3 and on account of the common pump shaft 3 are coaxial to one another. The pinions 4, 4' are surrounded by ring wheels 5, 5' which are arranged eccentrically to the pump shaft 3 and to the pinions 4, 4' and which mesh with the pinions 4, 4' at a point or in a region on the circumference. In the exemplary embodiment, the ring wheels 5, 5' are arranged with opposite eccentricity, that is to say are arranged with an offset in circumferential direction of 180 degrees. However, this is not mandatory for the embodiment, and the ring wheels 5, 5' may also be arranged eccentrically in the same direction, that is to say without offset in the circumferential direction or with any desired offset in the circumferential direction. The ring wheels 5, 5' are arranged at a fixed location and rotatably in a pump casing 6 or a cover 7 of the pump casing 6.

Sickle-shaped blades 8, 8' are fastened pivotably in a pump space between the ring wheels 5,5' and the pinions 4, 4' by means of pins 9, 9'. Tooth tips of teeth of the pinions 4, 4' and of the ring wheels 5, 5' brush along the sickle-shaped blades 8, 8' which seal off tooth interspaces on the circumference of the toothings. The internal gear pumps 2, 2' are therefore what are known as sickle pumps, the disclosure not being restricted to this form of construction, but instead also possibly having, for example, annular gear pumps (not illustrated). The pump spaces are sickle-shaped spaces which are located between the pinions 4, 4' and the ring wheels 5, 5' of the internal gear pumps 2, 2' and which extend over a limited circumferential region from a pump inlet to a pump outlet.

Between the internal gear pumps 2, 2' is located a partition 10 which, in the exemplary embodiment, is in the form of a circular disk with a middle hole 11 for the passage of the pump shaft 3. A circumferential surface 12 of the partition 10 is frustoconical, that is to say the circumferential surface 12 of the partition 10 widens in one axial direction or tapers in the opposite axial direction. The circumferential surface 12 bears sealingly against a countersurface 13 in the pump casing 6. The countersurface 13 is in the form of an inner cone frustum having an exact fit with the circumferential surface 12. The partition 10 separates the two internal gear pumps 2, 2' spatially by the amount of the thickness of the partition 10, and the partition 10 separates the two internal gear pumps 2, 2' hydraulically from one another. The partition 10 seals off the internal gear pumps 2, 2' on the end faces, facing it and bearing against it, of the internal gear pumps 2, 2' or the pinions 4, 4', the ring wheels 5, 5' and the sickle-shaped blades 8, 8'. The partition 10 is sealed off at the pump shaft 3 by means of sealing rings 14. Pump connections, to be precise pump inlets and pump outlets, are routed through the partition 10, although this is not illustrated in FIG. 1 for the sake of simplicity. They are described further below with reference to FIG. 2.

Arranged on those end faces of the internal gear pumps 2, 2' which face away from the partition 10 are pressure disks 15, 15' which seal off the internal gear pumps 2, 2' on these end faces and, in the illustrated exemplary embodiment, at the same time form shaft bearings for the pump shaft 3. In the casing cover 7, the pump shaft 3 is sealed off by means of a sealing ring 16, and a pump drive with an electric motor, not illustrated, is provided on this side. The pump casing 6 is closed on the other end face.

The internal gear pumps 2, 2' and the partition 10 arranged between them can be premounted as a subassembly on the pump shaft 3 and be inserted as a finished subassembly into the pump casing 6. The pump casing 6 may be a specific component; in the exemplary embodiment the pump casing 6 is a hydraulic block of the slip control device of the hydraulic vehicle brake system, the hydraulic pumps of which form the two internal gear pumps 2, 2' (not illustrated). Such hydraulic blocks for slip-controlled hydraulic vehicle brake systems are known per se, and, in addition to the hydraulic pumps, that is to say, here, the internal gear pumps 2, 2', further hydraulic components, such as solenoid valves, nonreturn valves and hydraulic accumulators, are inserted into them and are connected to one another by means of bores so as to form hydraulic circuits.

Figure 2:
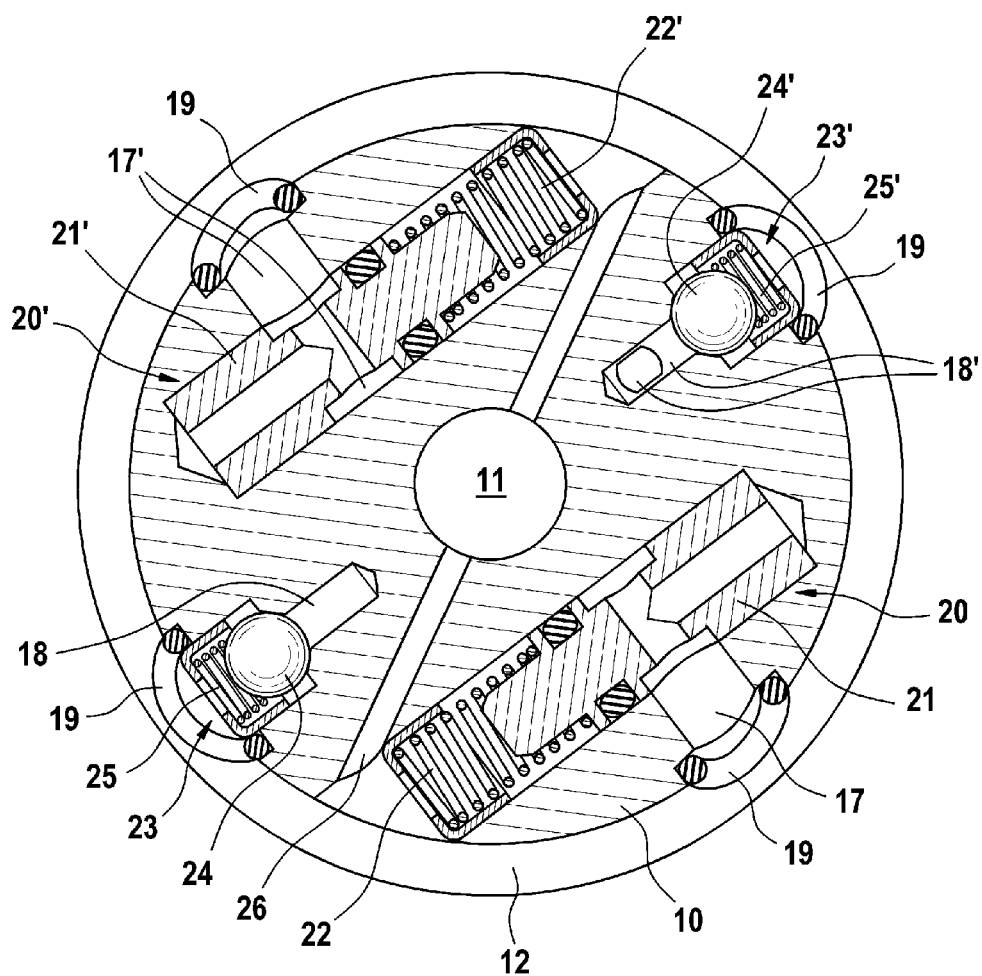
FIG. 2 shows a radial section through a partition of the double internal gear pump from FIG. 1.

FIG. 2 depicts a section through a mid-plane of the partition 10 radially to the pump shaft 3, and the frustoconical circumferential surface 12 can be seen, and also angled and partly stepped bores which form the pump inlets 17, 17' and pump outlets 18, 18'. The pump inlets 17, 17' and pump outlets 18, 18' form pump connections of the two internal gear pumps 2, 2' of the double internal gear pump 1 according to the disclosure. The pump inlets 17, 17' and pump outlets 18, 18' issue axially parallel through end faces of the partition 10 into the pump spaces of the internal gear pumps 2, 2' upstream or downstream of the sickle-shaped blades 8, 8' in the circumferential direction. The pump inlets 17, 17' and pump outlets 18, 18' have in the circumferential surface 12 of the partition 10 issues through which they communicate with corresponding pump connections in the pump casing 6 (hydraulic block). At the issues of the pump inlets 17, 17' and pump outlets 18, 18', sealing rings 19 are inserted in annular steps in the circumferential surface 12 of the partition 10 and, in the non-deformed state, project somewhat beyond the circumferential surface 12 of the partition 10. When the partition 10 is inserted into the pump casing 12, the sealing rings 19 come to bear against the frustoconical countersurface 13 which compresses the sealing rings 19 such that they are flush with the circumferential surface 12. The sealing rings 19 thereby bear with prestress against the frustoconical countersurface 13 and seal off the pump inlets 17, 17' and pump outlets 18, 18' at the transition from the pump casing 6 into the partition 10.

Valves of the two internal gear pumps 2, 2' are inserted into the pump inlets 17, 17' and into the pump outlets 18, 18'. In the exemplary embodiment illustrated, pressure reducing valves 20, 20' are inserted into the pump inlets 17, 17'. The pressure reducing valves 20, 20' are designed as linear slide valves, the pistons 21, 21' of which can be displaced counter to spring elements 22, 22' by being acted upon hydraulically with pressure. During displacement, the pistons 21, 21' reduce passage areas of the pump inlets 17, 17' and thus limit the hydraulic pressure. The valves in the pump outlets 18, 18' are non-return valves 23, 23'. They have valve balls 24, 24' which are loaded by spring elements 25, 25' against valve seats. Non-return valves without spring elements may also be used.

A bore 26 which is continuous in the diameter direction leaves from the middle hole 11 to the pump inlets 17, 17', so that liquid which may possibly overcome the sealing rings 14 is discharged to the pump inlets 17, 17'.

What is claimed is:
1. A double internal gear pump comprising:
   two internal gear pumps having a common pump shaft;
   a pump casing in which the two internal gear pumps and the pump shaft are received, the pump casing including a countersurface; and
   a partition received within the pump casing and arranged between the two internal gear pumps in the pump casing, the partition including a circumferential surface that widens in diameter in a first direction, wherein the pump casing includes a circumferential countersurface located between the two internal gear pumps against which the circumferential surface of the partition bears.

2. The double internal gear pump of claim 1, wherein the partition has a frustoconical circumferential surface.

3. The double internal gear pump of claim 1, wherein the pump casing is formed by a hydraulic block of a hydraulic vehicle brake system, said hydraulic block connecting the internal gear pumps hydraulically to at least one other hydraulic component of the vehicle brake system.

4. The double internal gear pump of claim 1, further comprising pinions on the two internal gear pumps, the pinions and the partition being premounted on the pump shaft as a subassembly which is inserted into the pump casing.

5. The double internal gear pump of claim 1, further comprising a pump connection which runs through the circumferential surface of the partition and through the countersurface in the pump casing.

6. The double internal gear pump of claim 5, further comprising an opening for the pump connection on the circumferential surface of the partition and/or on the countersurface in the pump casing, and a seal positioned at least partially within the opening.

7. The double internal gear pump of claim 1, wherein the partition includes at least one valve of one of the two internal gear pumps.

8. The double internal gear pump of claim 1, wherein the partition has a first end face arranged facing a first of the internal gear pumps and a second end face arranged facing a second of the internal gear pumps, and wherein the circumferential surface of the partition widens in diameter from the first end face to the second end face.

* * * * *